United States Patent
Tapti et al.

(10) Patent No.: US 10,046,787 B2
(45) Date of Patent: Aug. 14, 2018

(54) STEERING WHEEL FOR A VEHICLE

(71) Applicants: Hyundai Motor Europe Technical Center GmbH, Russelsheim (DE); Hyundai Motor Company, Seoul (KR); Kia Motors Corporation, Seoul (KR); Marquardt GmbH, Rietheim-Weilheim (DE)

(72) Inventors: Firat Tapti, Eppertshausen (DE); Volker Prescher, Kahl (DE); Daniel Gruler, Balgheim (DE); Lutz Bauer, Rietheim-Weilheim (DE); Lucian Vulcu, Judet Sibiu (RO); Florin Adrian Similie, Judet Sibiu (RO)

(73) Assignees: Hyundai Motor Company, Seoul (KR); Kia Motors Corporation, Seoul (KR); Marquardt GmbH, Rietheim-Weilheim (DE)

( * ) Notice: Subject to any disclaimer, the term of this patent is extended or adjusted under 35 U.S.C. 154(b) by 0 days.

(21) Appl. No.: 15/405,871

(22) Filed: Jan. 13, 2017

(65) Prior Publication Data
US 2018/0037247 A1    Feb. 8, 2018

(30) Foreign Application Priority Data
Aug. 8, 2016  (DE) .................. 10 2016 214 690

(51) Int. Cl.
*B62D 1/04*  (2006.01)
*B60K 35/00*  (2006.01)
*B62D 1/06*  (2006.01)

(52) U.S. Cl.
CPC .............. *B62D 1/046* (2013.01); *B60K 35/00* (2013.01); *B62D 1/06* (2013.01);
(Continued)

(58) Field of Classification Search
CPC .......... B62D 1/046; B62D 1/06; B60K 35/00; B60K 2350/1024; B60K 2350/1048; B60K 2350/352; B60K 2350/901; B60Y 2400/92
See application file for complete search history.

(56) References Cited

U.S. PATENT DOCUMENTS 8,918,252 B2    12/2014  Frojdh et al.
2006/0054479 A1*  3/2006  Iisaka .................... B62D 1/046
                                      200/61.57

FOREIGN PATENT DOCUMENTS

DE            454516 C  *  1/1928  ........... B60Q 1/1484
DE     102006016163 A1  * 10/2007  ........... B60R 16/005
(Continued)

*Primary Examiner* — Thomas C Diaz
(74) *Attorney, Agent, or Firm* — Mintz Levin Cohn Ferris Glovsky and Popeo, P.C.; Peter F. Corless (57) ABSTRACT

A steering wheel for a vehicle is provided. The steering wheel includes a steering wheel rim with an operating member formed as a ring segment of the steering wheel rim and has an exterior shell with at least a first shell part and a second shell part. The exterior shell is configured to at least partially rotate from an initial position around a framework structure. At least one first switch is switchable to at least partially rotate the exterior shell from the initial position around the framework structure. The exterior shell is in the initial position, at least one of the first shell part and the second shell part are actuated toward or away from the framework structure to switch at least one second switch.

12 Claims, 8 Drawing Sheets

(52) U.S. Cl.
CPC .......... *B60K 2350/1024* (2013.01); *B60K 2350/1048* (2013.01); *B60K 2350/352* (2013.01); *B60K 2350/901* (2013.01); *B60Y 2400/92* (2013.01)

(56) References Cited

FOREIGN PATENT DOCUMENTS

| | | | |
|---|---|---|---|
| JP | 2014162383 | 9/2014 | |
| KR | 10-1999-0017909 A | 3/1999 | |
| KR | 101484207 | 1/2015 | |
| KR | 10-2015-0102661 A | 9/2015 | |
| WO | WO-2008031481 A1 * | 3/2008 | ............ B60K 37/06 |

\* cited by examiner

STEERING WHEEL FOR A VEHICLE

CROSS-REFERENCE TO RELATED APPLICATION

This application claims priority to and the benefit of German Patent Application No. 102016214690.4 filed in the German patent office on Aug. 8, 2016, the entire contents of which are incorporated herein by reference.

BACKGROUND

Field of the Disclosure

The present disclosure relates to a steering wheel, and more particularly to a vehicle comprising a steering wheel rim with an operating member formed as a ring segment of the steering wheel rim.

Description of the Related Art

A steering wheel includes an operating member in the form of a ring segment of its steering wheel rim. Typically, the steering wheel having an operating member requires a number of conventional switches/buttons. The number of additional switches and buttons on the steering wheel are necessary to provide a driver with the ability to switch, activate and control a plurality of functions of vehicle devices while maintaining contact with the steering wheel. For example, the number of additional switches and buttons disposed on the steering wheel, create a complex environment for the driver to understand and remember the functions of all the switches/buttons of the steering wheel. [Note Please add above reference to the Invention Disclosure Statement.]

The above information disclosed in this section is merely for enhancement of understanding of the background of the disclosure and therefore it may contain information that does not form the prior art that is already known in this country to a person of ordinary skill in the art.

SUMMARY

The present disclosure provides an operating member that includes an upper shell part and a lower shell part that are connected with each other to form an exterior shell surrounding a framework structure fixed to an interior frame of the steering wheel rim. The exterior shell may be configured to rotate from an initial position around a first rotatory axis in relation to the framework structure to actuate at least one first switch of the operating member. Further, after at least a partial rotation of the exterior shell from an initial position around the framework structure, the lower shell part may be configured to rotate around a second rotatory axis running perpendicular to the first rotatory axis to actuate at least one second switch of the operating member.

The present disclosure includes a steering wheel with an operating member that provides for the use of at least one of a first shell part and a second shell part as a push or pull switch while the exterior shell remains in an initial position. Thus, the at least one second switch of the operating member may be actuated independently from at least one first switch (e.g., switchable by a rotation of the exterior shell out of an initial position at least partially around the framework structure).

In an exemplary embodiment of the steering wheel, the exterior shell may be coupled with the framework structure via at least one return spring and the exterior shell may be configured to be automatically transferred back to an initial position after at least partial rotation around the framework structure. In particular, the driver may reuse the exterior shell to switch the at least one first switch again by another rotation of the exterior shell without having to re-adjust the exterior shell in an initial position in the meantime. For example, the operating member may include a first fixing element and a second fixing element coupled together around an interior frame of the steering wheel rim to form the framework structure. The framework structure may be realized by using the interior frame of the steering wheel rim (e.g., formed as part of the steering wheel rim) and the two fixing elements that are fixable to the steering wheel rim by coupling the two fixing elements.

In an exemplary embodiment of the steering wheel, the operating member may include a push element disposed between the framework structure and the first shell part and the push element may be torque-proof during the at least partial rotation of the exterior shell out from an initial position around the framework structure and the push element may be actuated toward the framework structure with the first shell part. Accordingly, the at least one second switch may be prevented from being actuated by the at least partial rotation of the exterior shell from an initial position around the framework structure, but may be switchable by an actuation of at least the first shell part toward the framework structure. Further, a first rolling element may be disposed on an exterior surface of the framework structure and may protrude from opening formed through the push element. A first profile fixed to the first shell part or formed on the first shell part may abut the first rolling element during the rotation of the exterior shell from an initial position at least partially around the framework structure. Thus, a more improved haptic feedback to the driver at least partially rotating the exterior shell around the framework structure may be provided.

In another exemplary embodiment of the steering wheel, the operating member may include a pull element disposed between the framework structure and the second shell part. The pull element may be torque-proof during at least partially the rotation of the exterior shell from an initial position around the framework structure and the pull element may be separated from the framework structure together with the second shell part. The pull element may ensure that the at least one second switch is not switched by the at least partial rotation of the exterior shell out of its initial position around the framework structure, while the at least one second switch is actuated when at least the second shell part is pulled away from the framework structure.

Furthermore, a second rolling element may be disposed on the exterior surface of the framework structure and may protrude from an aperture formed through the pull element. Additionally, a second profile fixed to the second shell part or formed on the second shell part may abut the second rolling element during the at least partially rotation of the exterior shell from an initial position around the framework structure. The second rolling element and the second profile may provide for an improved ability of the driver to at least partially rotate the exterior shell around the framework structure. Moreover, the second rolling element and the second profile may provide a more improved haptic feedback of the driver during the rotary movement of the exterior shell. The at least one first switch and the second switch may be a mechanical micro switch. Accordingly, an inexpensive switch type may be used for the first switch and/or the at least one second switch.

In some exemplary embodiments of the steering wheel, at least one light aperture may be formed through the first shell part and light emitted within the interior of the operating member may illuminate the at least one light aperture. The driver may observe at least a part of the operating member with the light aperture in the dark. The operating member may include a printed circuit board with the first switch, the second switch or at least one light emitting diode disposed thereon. The light emitting diode may emit light within the interior of the operating member to illuminate the light aperture formed through the first shell part.

According to an exemplary embodiment of the steering wheel, a side of the printed circuit board with the at least one light emitting diode may be directed toward a gap between the push element and the framework structure. The light emitted by the at least one light emitting diode may be directed through at least a portion of the gap to at least one light aperture formed through the push element and then may be directed through the at least one light aperture formed through the push element to the at least one light aperture formed through the first shell part. In particular, one light emitting diode or a number of light emitting diodes may provide a sufficient illumination of the at least one light aperture formed through the first shell part.

The above-mentioned advantages are also caused in the case of a vehicle with such a steering wheel. The steering wheel may include all the features of the exemplary embodiments described above. In an exemplary embodiment of the vehicle, the vehicle may also include a display. In particular, at least one menu item of the display may be selectable by switching the at least one first switch or the at least one second switch of the operating member of the steering wheel. Accordingly, the use of the display may be improved for the driver.

BRIEF DESCRIPTION OF THE DRAWINGS

The drawings are used for reference in describing exemplary embodiments of the present disclosure and thus, the technical spirit of the present disclosure should not be analyzed to be limited to the accompanying drawings.

Unless indicated otherwise, the same reference numbers throughout the figures indicates similar elements.

DETAILED DESCRIPTION

Hereinafter, the exemplary embodiment of the present disclosure will be described in detail with reference to the accompanying drawings to allow those skilled in the art to easily practice the present disclosure. Advantages and features of the present disclosure and methods for achieving the same will be clearly understood with reference to the following detailed description of embodiments in conjunction with the accompanying drawings. However, the present disclosure is not limited to the embodiments disclosed herein, but may be implemented in various different forms. The embodiments are merely given to make the disclosure of the present disclosure complete and to completely instruct the scope of the disclosure to those skilled in the art, and the present disclosure should be defined by the scope of the claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed there between.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 1A:
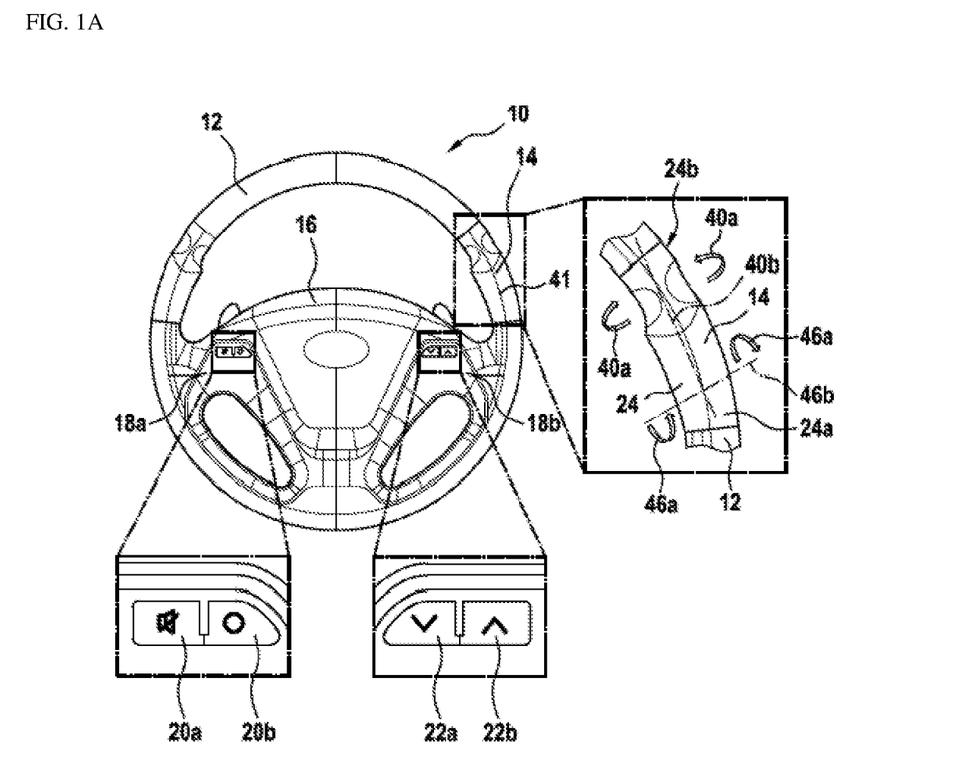
FIG. 1A is an exemplary schematic front view of the steering wheel according to the exemplary embodiment of the present disclosure.
Figure 1B:
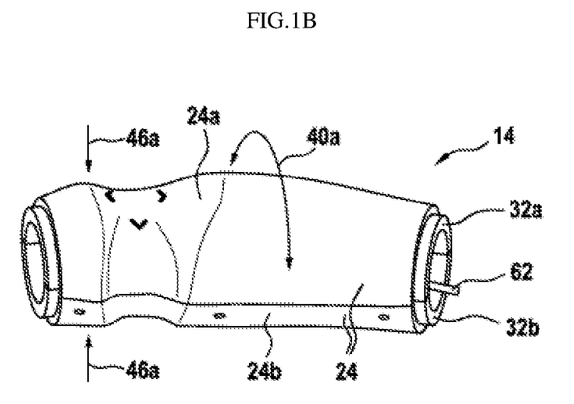
FIG. 1B is an exemplary schematic side view of the operating member of the steering wheel according to the exemplary embodiment of the present disclosure.
Figure 1C:
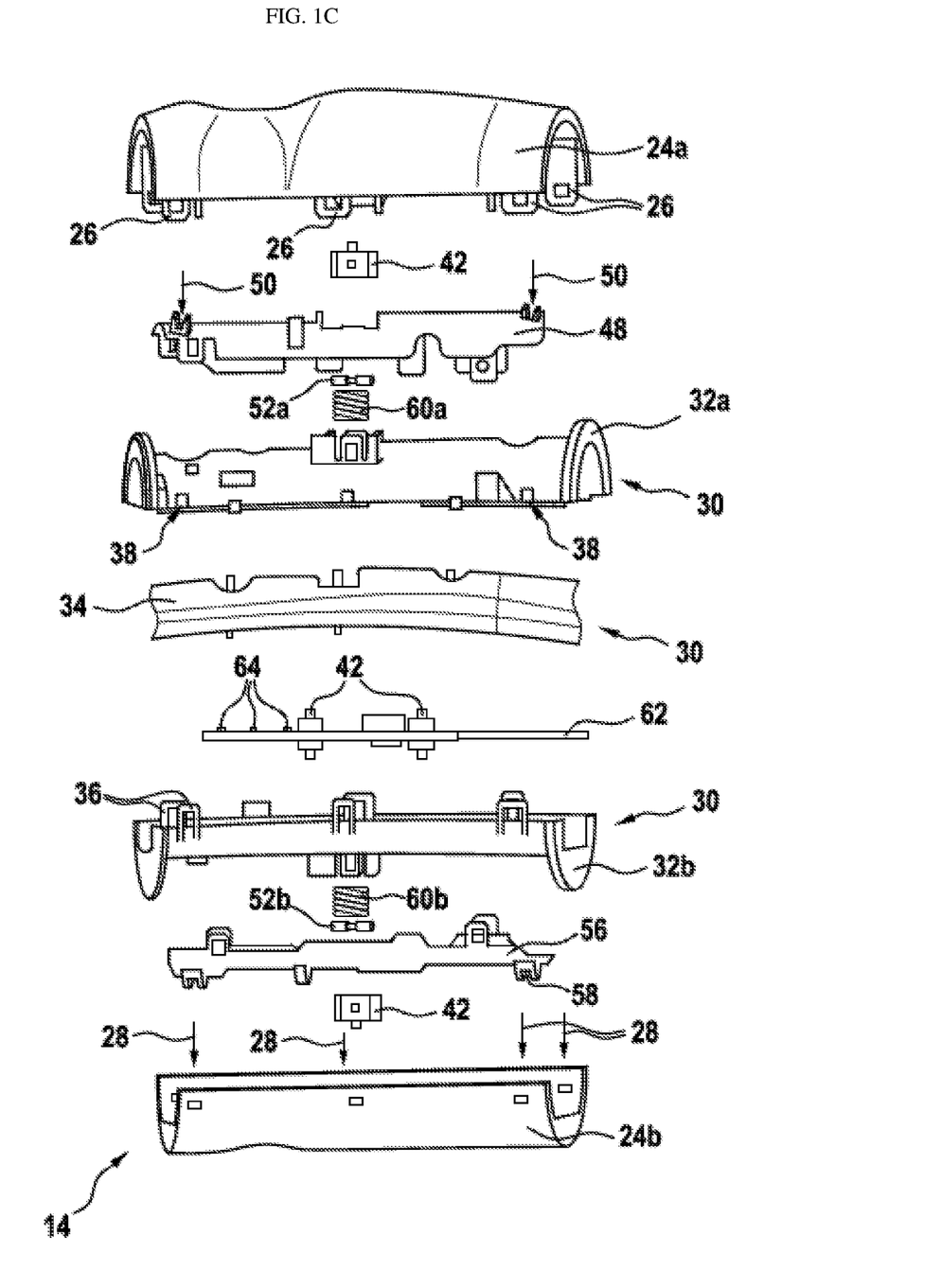
FIG. 1C is an exemplary explosion diagram of the operating member according to the exemplary embodiment of the present disclosure.
Figure 1D:
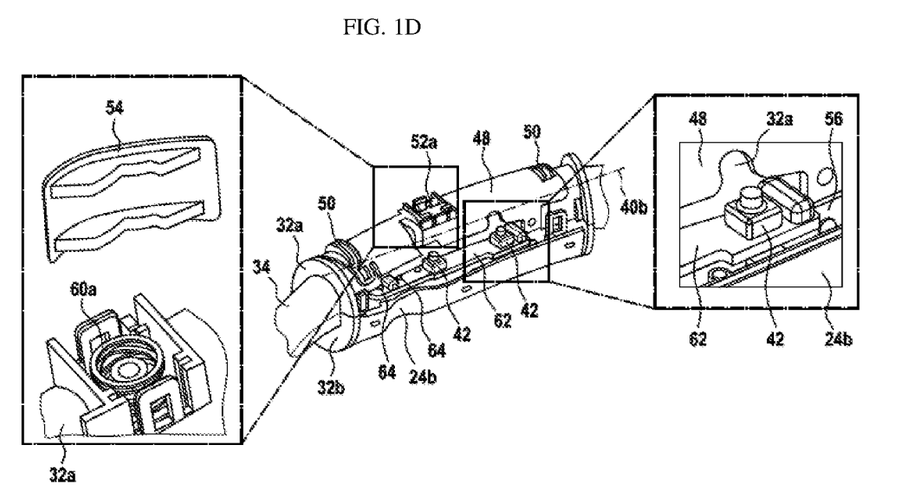
FIGS. 1D and 1E are schematic partial views of the operating member to illustrate its switching functions according to the exemplary embodiment of the present disclosure.
Figure 1E:
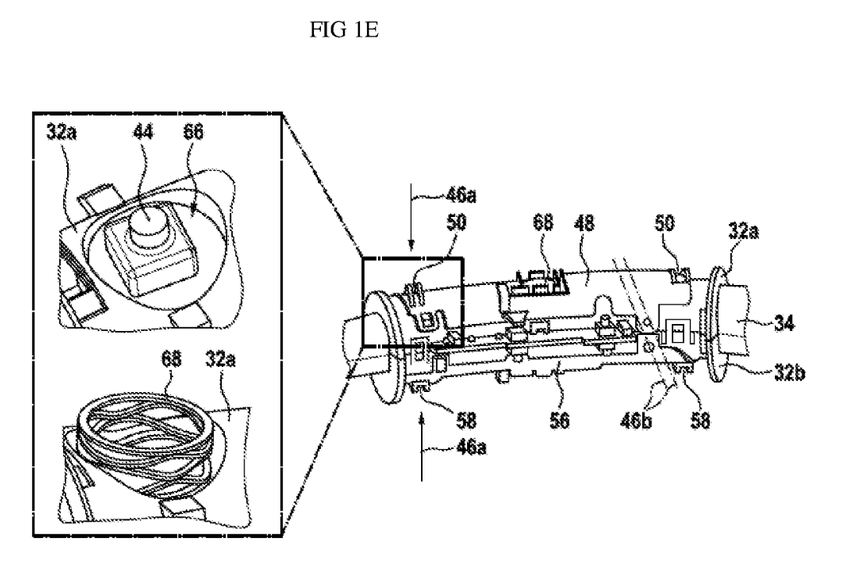

FIGS. 1A to 1E are exemplary embodiments that illustrate the steering wheel. FIG. 1A is an exemplary schematic front view of the steering wheel. FIG. 1B is an exemplary schematic side view of its operating member. FIG. 1C is an exemplary detailed diagram of the operating member. FIGS. 1D and 1E are exemplary schematic partial views of the operating member to illustrate the switching functions. The steering wheel 10 shown in FIG. 1A may be used in a variety of different vehicles. The use of the steering wheel 10 is not restricted to a certain vehicle type.

The steering wheel 10 may include at least a steering wheel rim 12 with an operating member 14 formed as a ring segment of the steering wheel rim 12. The steering wheel rim 12 may have a circularity. However, a feasibility of the steering wheel 10 may not be restricted to the (e.g., full) circularity of the steering wheel rim 12 shown in FIG. 1A. Moreover, a steering wheel center 16, as shown in FIG. 1A, that may be linked to the steering wheel rim 12 via a first (e.g., left) steering wheel spoke 18a and a second (e.g., right) steering wheel spoke 18b, may also be an optional feature of the steering wheel 10. Additionally, the buttons 20a and 20b disposed on the first steering wheel spoke 18a and the buttons 22a and 22b on the second steering wheel spoke 18b may provide examples for additional switches or buttons disposed on the steering wheel 10. The feasibility of the steering wheel 10 may not be restricted to a particular type of additional switches or buttons. Furthermore, as will be explained below, due to the advantageous operating member 14 of the steering wheel 10, additional switches or buttons may not be necessary.

FIGS. 1B and 1C show the operating member 14 (e.g., without the steering wheel 10). As seen by a comparison between FIGS. 1B and 1C, the operating member 14 may include an exterior shell 24 having a first shell part 24a and a second shell part 24b. The first shell part 24a and the second shell part 24b may be coupled to each other. In particular, at least one locking pin 26 of the first shell part 24a (e.g., or the second shell part 24b) may be inserted into at least one fixing aperture 28 formed in the second shell part 24b (e.g., or in the first shell part 24a). The first shell part 24a may be directed toward a driver side of the steering wheel 10 and may be a front shell part 24a or an upper shell part 24a. Additionally, the second shell part 24b may be a back shell part 24b or a lower shell part 24b.

The exterior shell 24 (e.g., formed by connecting the first shell part 24a with the second shell part 24b) may have an exterior form that corresponds to a design of the steering wheel rim 12. The exterior form of the exterior shell 24 may reduce an injury risk for a driver of the vehicle equipped with the steering wheel 10 when the driver impacts the exterior shell 24. The exterior shell 24 may partially surround a framework structure 30 fixed to the steering wheel rim 12 or may be formed as portion of the steering wheel rim 12. As shown in FIGS. 1A to 1E, the operating member 14 may include a first fixing element 32a and a second fixing element 32b coupled together around (e.g., a part of) an interior frame 34 of the steering wheel rim 12 to form the framework structure 30. For example, the first fixing element 32a and the second fixing element 32b may be coupled together and may immobilize the interior frame 34 of the steering wheel rim 12 by inserting at least one locking pin 36 of the second fixing element 32b (e.g., the first fixing element 32a) into at least one fixing aperture 38 in the first fixing element 32a (e.g., in the second fixing element 32b). However, the feasibility of the steering wheel 10 is not restricted to the framework structure 30 that includes the two fixing elements 32a and 32b and (e.g., a part of) the interior frame 34 of the steering wheel rim 12.

The exterior shell 24 may be coupled directly or indirectly with the framework structure 30 when the exterior shell 24 is at least partially rotatable out of an initial position around the framework structure 30 (shown by arrow 40a in FIG. 1B). For example, the exterior shell 24 may be rotatable from an initial position around a first rotatory axis 40b disposed parallel to a tangent of a circle line 41 proceeding through the middle of the steering wheel rim 12. The first rotatory axis 40b may also be tangential to the circle line 41.

The operating member 14 may include at least one first switch 42 configured to be switchable by at least partial rotation of the exterior shell 24 from an initial position around the framework structure 30 (see FIG. 1D). In other words, the at least one first switch 42 may be switched by a rotation of the exterior shell 24 of less than 10 degree (e.g., about a rotation of 6 degree, may be sufficient.) Further, the operating member 14 may include at least one second switch 44 which is not actuated/switched by the at least partially rotation of the exterior shell 24 from an initial position around the framework structure 30 (see FIG. 1E).

As is shown in FIG. 1B by the arrows 46a, when the exterior shell 24 is in the initial position at least one of the first shell part 24a and the second shell part 24b may be actuated (e.g., pushable) toward the framework structure 30 and may also be actuated (e.g., pullable) away from the framework structure 30 when the at least one second switch 44 is actuated (e.g., switched). In particular, the at least one second switch 44 may also be switchable while the exterior shell 24 is rotated out of the initial position by moving at least one of the first shell part 24a and the second shell part 24b toward the framework structure 30 or away from the framework structure 30. Accordingly, the at least one second switch 44 may be actuated (e.g., switched) independently of an orientation of the exterior shell 24. A switching mechanism of the at least one first switch 42 and the at least one second switch 44 will be explained in more details below.

Further, a push movement and pull movement of the first shell part 24a and the second shell part 24b may occur when the exterior shell 24 is in the initial (e.g., unrotated) position. The push movement and pull movement for switching the at least one second switch 44 may be in a range of about 1 to 2 mm, for example, about 1.5 mm. The driver may have the opportunity to actuate (e.g., switch) the at least one second switch 44 without performing the rotation of the exterior shell 24 from the initial position. Additionally, the at least one second switch 44 of the operating member 14 may be actuated (e.g., switched) independently from at least one first switch 42. The at least one second switch 44 may be configured to control (e.g., actuating or switching) at least one function or device that differs from at least one other function or device, that may be configured to be controlled (e.g., actuated or switched) by using the at least one first switch 42. Since the at least one second switch 44 may be configured to be controlled (e.g., actuated or switched) independently from at least one first switch 42. The at least one second switch 44 may be used to replace at least one other conventional button or switch. The number of additional switches or buttons on the steering wheel 10 may be reduced without reducing a plurality of functions or devices that may be configured to be controlled (e.g., actuated or switched) by the driver while maintaining contact with the steering wheel 10.

The actuation movements (e.g., the push movement or the pull movement) of the first shell part 24a or the second shell part 24b may be a common movement of the exterior shell 24. In particular, the first shell part 24a may be actuated (e.g., pushed) toward the framework structure 30 and the second shell part 24b may be actuated away from the framework structure 30 or vice versa. The actuation movements may be a movement of the exterior shell 24 at least partially around a second rotatory axis 46b. For example, a movement of the exterior shell 24 may be more easily preformed. Accordingly, an operation of the operating member 14 may be more easily performed by the driver.

In particular, a first force of about 20 Newton (N) may be sufficient for at least partial rotation of the exterior shell 24 from an initial position around the framework structure 30 and may be configured to actuate (e.g., switch) the at least one first switch 42. Additionally, a second force about 20 N may actuate the push movement or pull movement of the first shell part 24a or the second shell part 24b to actuate (e.g., switch) the at least one second switch 44. Accordingly, an unintended misuse of the operating member 14 may be prevented. Furthermore, the driver operating the operating member 14 may have an improved operation control. The driver may receive an acoustic feedback provided by the at least one first switch 42, the at least one second switch 44 or any other feature of the operating member 14.

In the exemplary embodiment of FIGS. 1A to 1E, the operating member 14 may include a push element 48 disposed between the framework structure 30 and first shell part 24a when the push element 48 is torque-proof during the at least partial rotation of the exterior shell 24 from an initial position at around the framework structure 30. However, the push element 48 may be configured to be actuated (e.g., pushable) toward the framework structure 30 together with the first shell part 24a (e.g., when a pressure or force is applied on the exterior shell 24.) The first shell part 24a may be coupled to the push element 48 via at least one locking pin of the first shell part 24a (not shown) inserted into at least one notch 50 formed on an exterior surface of the push element 48. For example, the exterior surface of the push element 48 may be directed toward the first shell part 24a and away from the framework structure 30. The at least one notch 50 may extend partially around the first rotatory axis 40b and the at least one locking pin of the first shell part 24a may be configured to move within the at least one notch 50 during the rotation of the exterior shell 24 from the initial position at least partially around the framework structure 30. Additionally, the rotation of the exterior shell 24 from the initial position does not cause a rotation of the push element 48 in relation to the framework structure 30. Further, the at least one second switch 44 may be configured to be actuated (e.g., switched) when the exterior shell 24 is rotated out of the initial position.

As is shown in FIG. 1D, an aperture may be formed through the push element 48. A first rolling element 52a may be disposed on an exterior surface of the first fixing element 32a and framework structure 30 and may protrude from the aperture formed through the push element 48. A first profile 54, fixed to the first shell part 24a or formed on (e.g., an interior surface directed toward the framework structure 30) the first shell part 24a may abut the first rolling element 52a during the at least partial rotation of the exterior shell 24 from the initial position around the framework structure 30. In other words, the contact between the first rolling element 52a and the first profile 54 during the rotation of the exterior shell 24 may provide a haptic feedback to a driver at least partially rotating the exterior shell 24 around the framework structure 30 to actuate (e.g., switch) the at least one first switch 42 (e.g., without actuating/switching the at least one second switch 44).

Furthermore, the operating member 14 may include a pull element 56 disposed between the framework structure 30 and the second shell part 24b and may provide for the pull element 56 to be torque-proof during the at least partial rotation of the exterior shell 24 from the initial position around the framework structure 30. For example, at least one (not shown) locking pin of the second shell part 24b may be inserted into at least one notch 58 formed on an exterior surface of the pull element 56 (e.g., directed toward the second shell part 24b and away from the framework structure 30). In other words, a linkage between the second shell part 24b and the pull element 56 may provide for the pull element 56 to be separated (e.g., pullable away) from the framework structure 30 together with the second shell part 24b (e.g., when the driver pulls at the second shell part 24b). In the exemplary embodiment of FIGS. 1A to 1E, a second rolling element 52b may be disposed on an exterior surface of the framework structure 30 and may protrude from an aperture formed through the pull element 56 and a (not shown) second profile fixed to the second shell part 24b or formed on the second shell part 24b may abut the second rolling element 52b during the at least partial rotation of the exterior shell from the initial position around the framework structure 30. The addition of second rolling element 52b and the second profile improves the haptic feedback to the driver during the rotation of the exterior shell 24.

The exterior shell 24 may be coupled indirectly with the framework structure 30 via at least one return spring 60a and 60b when after rotation at least partially around the framework structure 30 the exterior shell 24 may be automatically transferred back to the initial position. Further, a force required to rotate the exterior shell 24 at least partially around the framework structure 30 may be determined by the at least one return spring 60a and 60b. In the example of FIG. 1A to 1E, the at least one return spring 60a and 60b may be a first wave spring 60a disposed between the first fixing element 32a and the framework structure 30 and the first shell part 24a and a second return spring 60b disposed between the second fixing element 32b and framework structure 30 and the second shell part 24b.

The at least one first switch 42 may be disposed in the operating member 14 in at least one position that may be configured to provide for a detection of the rotation of the exterior shell 24 from the initial position at least partially around the framework structure 30 by the first switch 42 or at least one of the first switches 42. The at least one first switch 42 may be a mechanical micro switch. The operating member 14 may include a printed circuit board 62 on which the at least one first switch 42. Furthermore, at least one light emitting diode 64 may be disposed on the printed circuit board 62 of the operating member 14. The at least one light emitting diode 64 may be used to illuminate the operating member 14 at least partially from the interior, as will be explained in detail below.

The at least one second switch 44 may be disposed between the push element 48 and the first fixing element 32a and the framework structure 30, as shown in FIG. 1E. Furthermore, the second switch 44 or at least one of more second switches 44 may be disposed between the pull element 56 and the second fixing element 32b and the framework structure 30. For example, at least one recess 66 may be formed on an exterior surface of the first fixing element 32a, the second fixing element 32b and the framework structure 30. The at least one second switch 44 may be inserted in the at least one recess 66 and a portion of each second switch 44 may protrude from the recess 66. The at least one second switch 44 may be at least one mechanical micro switch. Furthermore, at least one spring 68 may be disposed between the push element 48 and the first fixing element 32a or the pull element 56 and the second fixing element 32b in the at least one recess 66. The at least one spring 68 may be a compression spring or an extension spring. Furthermore, the at least one second switch 44 may be disposed on the printed circuit board 62 of the operating member 14.

Figure 2A:
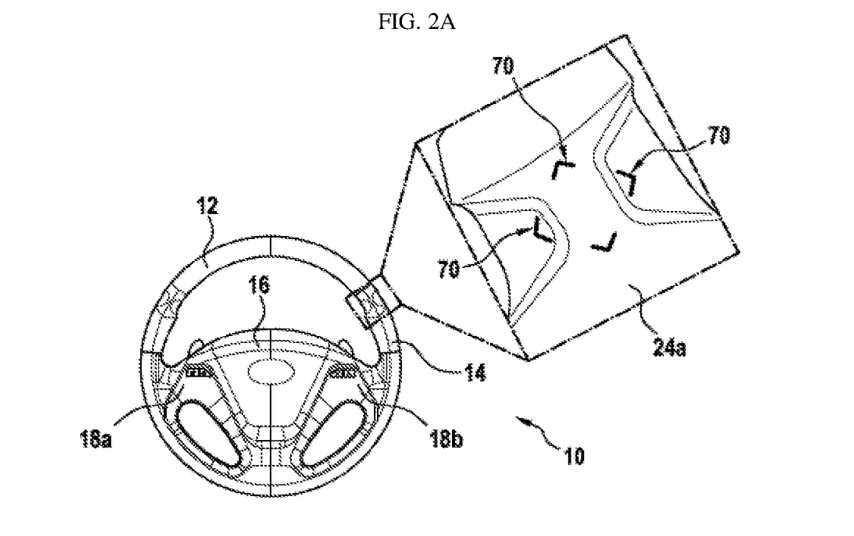
FIG. 2A is an exemplary schematic front view of the steering wheel according to the exemplary embodiment of the present disclosure.
Figure 2B:
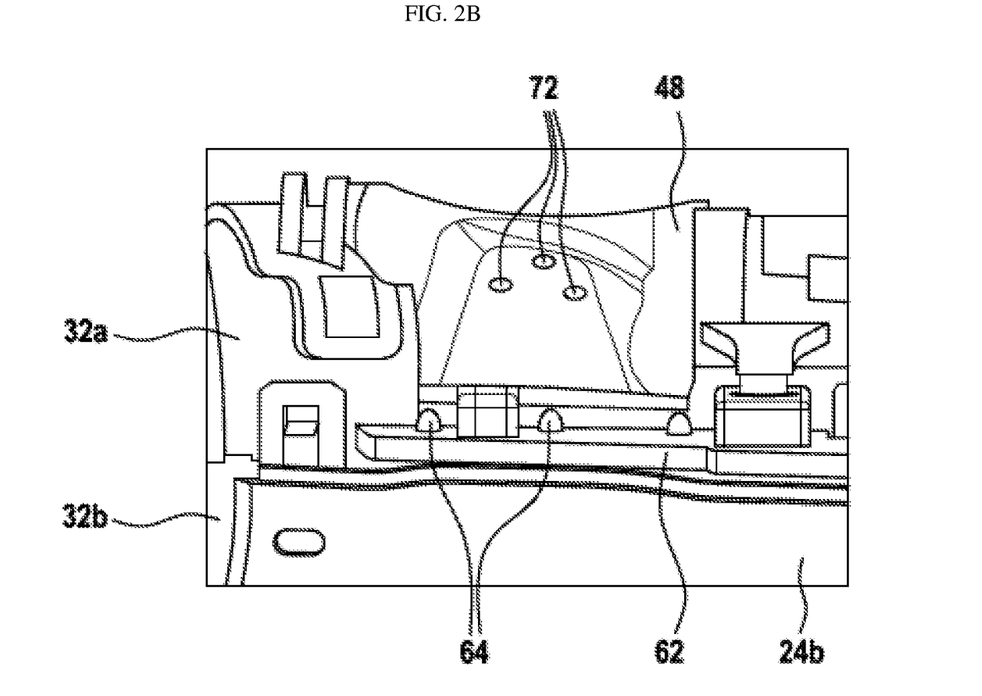
FIG. 2B is an exemplary schematic partial view of its operating member according to the exemplary embodiment of the present disclosure.
Figure 2C:
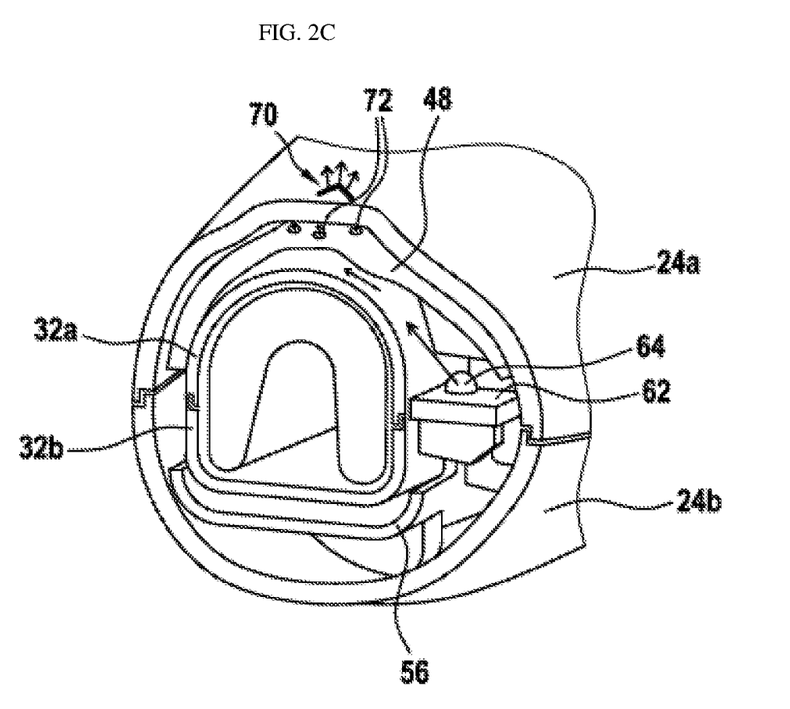
FIG. 2C is an exemplary schematic cross-sectional view through the operating member according to the exemplary embodiment of the present disclosure.

FIGS. 2A to 2C illustrate an exemplary embodiment of the steering wheel. FIG. 2A is an exemplary schematic front view of the steering wheel. FIG. 2B is an exemplary schematic partial view of an operating member. FIG. 2C is an exemplary schematic cross-sectional view through the operating member. The steering wheel 10 shown in FIG. 2A may include an operating member 14, wherein at least one light aperture 70 may be formed through the first shell part 24a of the operating member 14. Accordingly, light emitted within the interior of the operating member 14 may be configured to illuminate the at least one light aperture 70. Therefore, at least a portion of the operating member 14 with the at least one light aperture 70 may be visible in low light conditions. The at least one light aperture 70 may have the form of a symbol that illustrates to a driver how to operate the operating member 14 and which functions may be controlled (e.g., activated or switched) by operating the operating member 14.

In the exemplary embodiments of FIGS. 2A to 2C, a side of the printed circuit board 62 with the at least one light emitting diode 64 may be directed toward a separation (e.g., gap) between the push element 48 and the framework structure 30 that may allow light emitted by the at least one light emitting diode 64 to be directed through at least a part of the gap. Moreover, at least one light aperture 72 may be formed through the push element 48. The light emitted by the at least one light emitting diode 64 may be directed through at least a part of the gap to the at least one light aperture 72 formed through the push element 48. Then, the light may be directed through the at least one light aperture 72 formed through the push element 48 to the at least one light aperture 70 formed through the first shell part 24a. The advantage of such a light path through the operating member 14 may be a decrease in the number of light emitting diodes 64 required to illuminate at least one sub-unit of the operating member 14 that may provide more improved visibility for the driver. Accordingly, it is not necessary to equip the operating member 14 with additional light emitting diodes to illuminate portions of the operating member 14 which the driver does not have to see to be able to operate the operating member 14. For example, three light emitting diodes 64 or even less may provide for an operation of the operating member 14 in low light conditions and may be performed more easily by the driver.

Figure 3A:
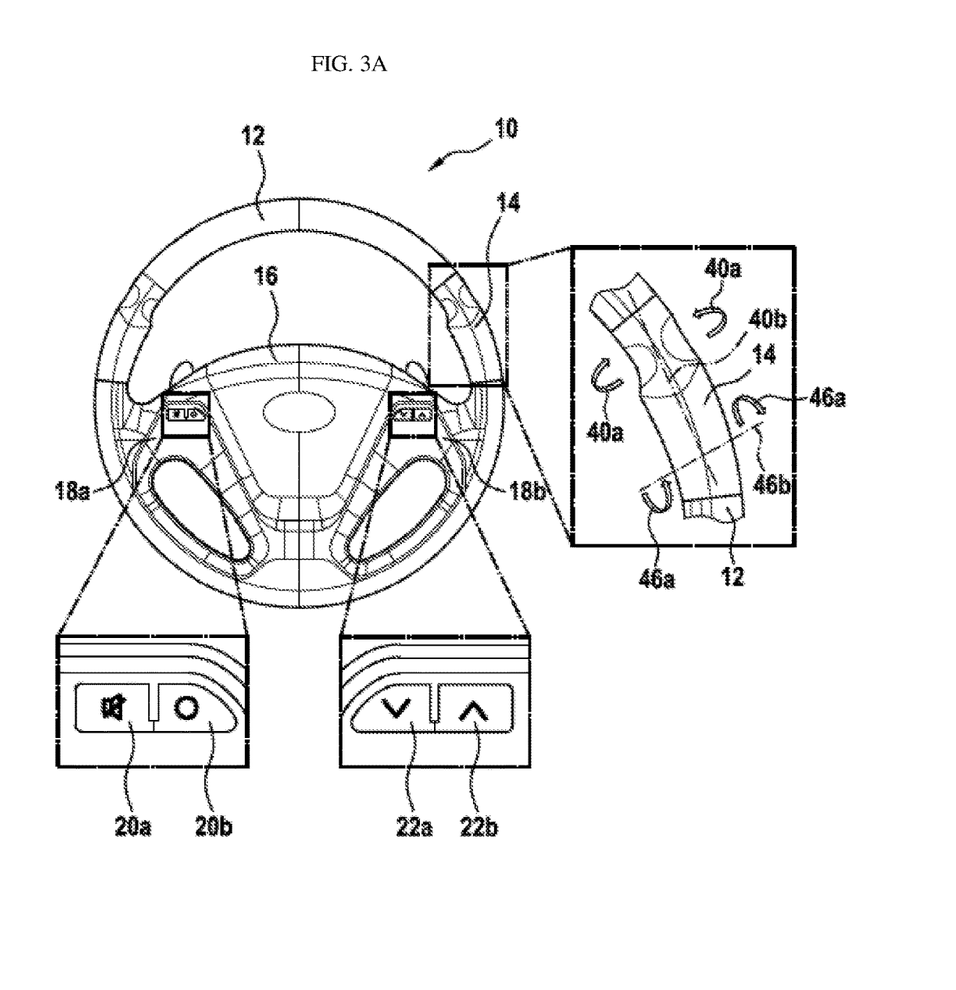
FIG. 3A shows an exemplary steering wheel according to the exemplary embodiment of the present disclosure.
Figure 3B:
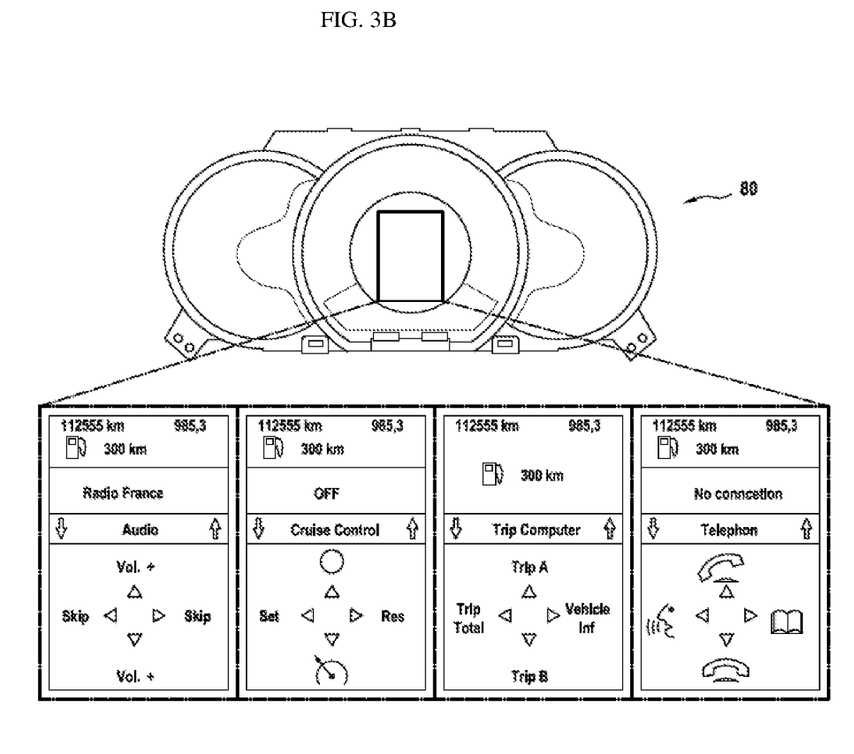
FIG. 3B shows an exemplary display according to the exemplary embodiment of the present disclosure.

The exemplary embodiments described above have a relative low quantity of different parts. The reduced number of different parts may provide for more improved fabrication and may reduce the production costs. FIGS. 3A and 3B illustrate an exemplary embodiment of the vehicle. FIG. 3A shows a steering wheel and FIG. 3B shows a display. The vehicle equipped with the steering wheel 10, may be one of the above-described exemplary embodiments, also may include a display 80. The at least one menu item of the display 80 may be selectable by switching the at least one first switch 42 and the at least one second switch 44 of the operating member 14 of the steering wheel 10. Accordingly, the operating member 14 may be configured to perform a joystick function for the display 80. For example, an audio function, a telephone function, a trip computer function or a cruise control function may be activated (e.g., controlled or switched) by the at least one first switch 42 or the at least one second switch 44.

The operating member provided by the exemplary embodiments may be usable as a switch system with an increased number of switch functions. The operating member may therefore replace an increased number of conventional switches or buttons. In particular, the number of additional switches or buttons on the inventive steering wheel may be reduced without reducing a driver's ability to switch, activate or control a plurality of functions or devices of the vehicle while maintaining contact with the steering wheel. Accordingly, the number of additional switches and buttons of the inventive steering wheel may be reduced and may therefore provide for simplified process for the driver to understand and remember the functions of all the switches and buttons disposed on the steering wheel.

The advantageous operating member of the inventive steering wheel may provide a multiple select switch. The advantageous operating member of the inventive steering wheel may be an intuitive joystick switch. Moreover, the operating member may provide for more adequate haptic feedback. An integration of the operating member in the inventive steering wheel may provide an improved design of the steering wheel and reduced injury risk when that the driver impacts the inventive steering wheel during a collusion.

While this disclosure has been described in connection with what is presently considered to be exemplary embodiments, it is to be understood that the disclosure is not limited to the disclosed exemplary embodiments, but, on the contrary, is intended to cover various modifications and equivalent arrangements included within the spirit and scope of the appended claims.

What is claimed is:

1. A steering wheel for a vehicle, comprising:
a steering wheel rim with an operating member formed as a ring segment of the steering wheel rim,
wherein the operating member includes an exterior shell having at least a first shell portion and a second shell portion,
wherein the exterior shell partially surrounds a framework structure fixed to the steering wheel rim or formed as part of the steering wheel rim, and
wherein the exterior shell is rotatably coupled with the framework structure and configured to partially rotate the exterior shell from an initial position around the framework structure; and
at least one first switch configured to be partially displaced by the rotation of the exterior shell from the initial position around the framework structure,
wherein the operating member includes at least one second switch which is not actuated by the rotation of the exterior shell out of the initial position at least partially around the framework structure, and
wherein with the exterior shell disposed in the initial position at least one of the first shell part and the second shell part are configured to be displaced toward or away from the framework structure when the at least one second switch is actuated.

2. The steering wheel according to claim 1, wherein the exterior shell is coupled to the framework structure by a return spring and when after partial rotation around the framework structure, the exterior shell is automatically transferred back in the initial position.

3. The steering wheel according to claim 1, wherein the operating member includes a first fixing element and a second fixing element coupled together around an interior frame of the steering wheel rim to form the framework structure.

4. The steering wheel according to claim 1, wherein the operating member includes a push element disposed between the framework structure and the first shell part, the push element is torque-proof during the partial rotation of the exterior shell from the initial position around the framework structure and the push element is actuated toward the framework structure together with the first shell part.

5. The steering wheel according claim 4, further comprising:
   a first rolling element is disposed on an exterior surface of the framework structure and protrudes from an aperture formed through the push element; and
   a first profile fixed to the first shell part or formed on the first shell abuts the first rolling element during the partial rotation of the exterior shell from an initial position around the framework structure.

6. The steering wheel according to claim 1, wherein the operating member includes a pull element disposed between the framework structure and the second shell part, the pull element is torque-proof during the partial rotation of the exterior shell from the initial position around the framework structure and the pull element is configured to be actuated away from the framework structure together with the second shell part.

7. The steering wheel according claim 6, further comprising:
   a second rolling element is disposed on the exterior surface of the framework structure and protrudes from an aperture formed through the pull element; and
   a second profile fixed to the second shell part or formed on the second shell part abuts the second rolling element during the partial rotation of the exterior shell from the initial position around the framework structure.

8. The steering wheel according to claim 1, wherein the at least one first switch and the at least one second switch are mechanical micro switches.

9. The steering wheel according to claim 1, wherein at least one light aperture is formed through the first shell part and configured to illuminate the at least one light aperture by light emitted inside the operating member.

10. The steering wheel according to claim 1, wherein the operating member includes a printed circuit board having the at least one first switch, the at least one second switch, or at least one light emitting diode disposed thereon.

11. The steering wheel according to claim 10, wherein a side of the printed circuit board with the at least one light emitting diode is directed toward an aperture between push element and the framework structure and configured to direct light emitted by the at least one light emitting diode through at least a part of the gap to at least one light aperture formed through the push element and then is directed through the at least one light aperture formed through the push element to the at least one light aperture formed through the first shell part.

12. The steering wheel according to claim 1, further comprising a display disposed in the vehicle, and wherein at least one menu item of the display is selectable by switching the at least one first switch or the at least one second switch of the operating member of the steering wheel.

* * * * *